(12) United States Patent
Ozarow et al.

(10) Patent No.: US 7,454,225 B2
(45) Date of Patent: Nov. 18, 2008

(54) METHOD AND APPARATUS FOR REDUCING TRANSMITTED ENERGY IN POWER-CONTROLLED SYSTEMS BASED ON EARLY DECODING

(75) Inventors: Lawrence H. Ozarow, Morris, NJ (US); Ashok N. Rudrapatna, Basking Ridge, NJ (US); Naresh Sharma, Budd Lake, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 553 days.

(21) Appl. No.: 11/023,991

(22) Filed: Dec. 28, 2004

(65) Prior Publication Data

US 2006/0142038 A1 Jun. 29, 2006

(51) Int. Cl.
*H04B 7/00* (2006.01)
(52) U.S. Cl. ............... 455/522; 456/69; 456/67.11
(58) Field of Classification Search .......... 455/522, 455/69, 450, 67.11, 445; 370/345, 317, 394, 370/342, 278; 714/751, 746
See application file for complete search history.

(56) References Cited

U.S. PATENT DOCUMENTS

| 6,046,990 | A * | 4/2000 | Chennakeshu et al. ...... 370/317 |
| 6,189,123 | B1 * | 2/2001 | Anders Nystrom et al. . 714/751 |
| 6,603,752 | B1 * | 8/2003 | Saifuddin et al. ........... 370/335 |
| 2004/0224639 | A1 * | 11/2004 | Melero ................ 455/67.11 |
| 2005/0043051 | A1 * | 2/2005 | Takano et al. .............. 455/522 |
| 2005/0239413 | A1 * | 10/2005 | Wiberg et al. ............... 455/69 |
| 2005/0254478 | A1 * | 11/2005 | Ozluturk et al. ............ 370/342 |
| 2005/0271028 | A1 * | 12/2005 | Proctor, Jr. ................ 370/345 |
| 2006/0252445 | A1 * | 11/2006 | Kim et al. .................. 455/522 |
| 2007/0011553 | A1 * | 1/2007 | Altahan et al. ............. 714/746 |
| 2007/0066320 | A1 * | 3/2007 | Padovani et al. ........... 455/450 |

FOREIGN PATENT DOCUMENTS

EP 1 458 128 A1 2/2004

OTHER PUBLICATIONS

European Search Report EP 05 25 7738 dated Mar. 16, 2006.
Harri Holma, Antti Toskala, "*WCDMA for UMTS: Radio Access for Third Generation Mobile Communications*" Winley & Sons, XP 002372510 pp. 34-36 (2001).

* cited by examiner

*Primary Examiner*—Tan Trinh

(57) ABSTRACT

The present invention provides a method for reducing transmitted energy based on early decoding. The method includes accessing a first portion of a block including a plurality of symbols indicative of an encoded message. The first portion has been transmitted at a first transmission power and having less than all of the plurality of symbols. The method also includes attempting to decode the encoded message using the first portion of the block, determining whether the encoded message was decoded, and providing an indication of a second transmission power in response to determining that the encoded message was decoded.

12 Claims, 5 Drawing Sheets

METHOD AND APPARATUS FOR REDUCING TRANSMITTED ENERGY IN POWER-CONTROLLED SYSTEMS BASED ON EARLY DECODING

BACKGROUND OF THE INVENTION

1. Field of the Invention

This invention relates generally to telecommunications systems, and, more particularly, to wireless telecommunication systems.

2. Description of the Related Art

The transmission power used to transmit symbols over an air interface, e.g. the air interface between a mobile unit and a base station in a wireless telecommunication system, is typically determined by balancing competing constraints. For example, increasing the transmission power may reduce a bit error rate associated with transmissions over the air interface. However, increasing the transmission power may also increase system interference between mobile units and/or base stations. Increasing the transmission power of a transmitter in a mobile unit may also reduce the operational lifetime of a battery in the mobile unit. Thus, the transmission power may be selected to balance the competing desires for a low bit error rate, low system interference, and long battery life.

The optimal transmission power typically varies over time. For example, the transmission power of a transmitter in a mobile unit and/or a base station may be continually increased to maintain an acceptable bit error rate as the mobile unit moves away from the base station, even though this may result in reduced battery life and/or increased system interference. Thus, closed loop power control systems may be used to control the transmission power of transmitters in wireless telecommunication systems. In a typical closed loop power control system, such as may be implemented in wireless telecommunications systems that operate in accordance with CDMA 2000 and/or UMTS protocols, feedback information is sent from a receiver to a transmitter at regular intervals. For example, the transmission power associated with slots in a frame may be controlled using a single power control bit that may be transmitted once per slot. The power control bit may instruct the transmitter to either reduce or increase the transmitted power for the next slot, depending upon a signal-to-noise ratio associated with a received signal, such as a pilot or traffic signal.

Coded transmission using closed loop power control may use more power than is needed to achieve the desired performance. The inefficiencies in the closed loop power control system may be caused by temporal channel variations in wireless telecommunication systems, insufficient granularity and/or step-size in the allowable levels of transmitted power, latencies in the power control loop, and the like. Consequently, closed loop power control may result in unnecessarily large system interference and reduced battery life.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method is provided for reducing transmitted energy based on early decoding. The method includes accessing a first portion of a block including a plurality of symbols indicative of an encoded message. The first portion has been transmitted at a first transmission power and having less than all of the plurality of symbols. The method also includes attempting to decode the encoded message using the first portion of the block, determining whether the encoded message was decoded, and providing an indication of a second transmission power in response to determining that the encoded message was decoded.

BRIEF DESCRIPTION OF THE DRAWINGS

The invention may be understood by reference to the following description taken in conjunction with the accompanying drawings, in which like reference numerals identify like elements, and in which.

Figure 1:
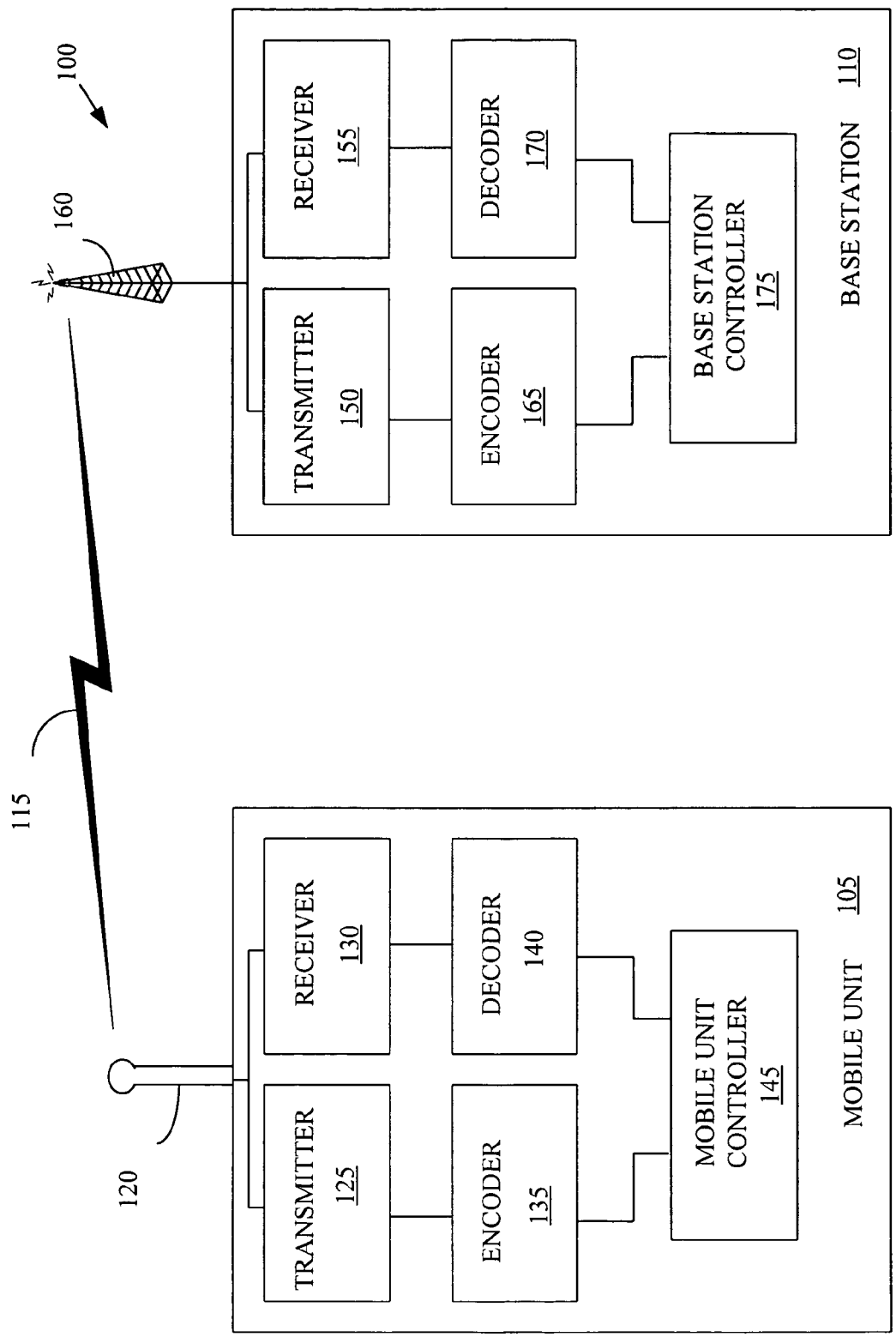
FIG. 1 shows a wireless telecommunication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, a wireless telecommunication system 100 is shown. The wireless telecommunications system 100 includes a mobile unit 105 and a base station 110. In various alternative embodiments, the mobile unit 105 may be a cellular telephone or any other desirable device including a personal computer, a laptop computer, a personal data assistant, and the like. Moreover, in alternative embodiments, the base station 110 may be an access point, a relay, and the like.

The mobile unit 105 and the base station 110 communicate using a wireless telecommunications link 115. In accordance with common usage in the art, the wireless telecommunications link 115 will be referred to hereinafter as the air interface 115.

The mobile unit 105 and the base station 110 exchange messages across the air interface 115 according to various protocols. For example, the mobile unit 105 and the base station 110 may exchange messages according to a Universal Mobile Telephone System (UMTS) protocol, a Global System for Mobile Telecommunications (GSM) protocol, and the like. However, the mobile unit 105 and the base station 110 are not limited to the aforementioned protocols. In alternative embodiments, any desirable wireless telecommunication protocol may be used to exchange messages across the air interface 115. For example, the air interface 115 may operate according to a Bluetooth protocol, an 802.11 protocol, and the like. As should be appreciated by persons of ordinary skill in the art, the messages include a variety of signaling and/or data messages that may be transmitted in the various types of frames or blocks. For example, a Radio Layer Protocol (RLP) includes control frames, data frames, fill frames, and idle frames.

The mobile unit 105 includes at least one antenna 120 that is coupled to a transmitter 125 and a receiver 130. The transmitter 125 is coupled to an encoder 135 and the receiver 130 is coupled to a decoder 140, and the encoder 135 and the decoder 140 are coupled to a mobile unit controller 145. In the illustrated embodiment, the transmitter 125, the receiver 130, the encoder 135, the decoder 140, and the mobile unit controller 145 are depicted as separate elements. However, persons of ordinary skill in the art should appreciate that the present invention is not so limited. In alternative embodiments, portions of the transmitter 125, the receiver 130, the encoder 135, the decoder 140, and/or the mobile unit controller 145 may be combined into a single element or may be incorporated into other portions of the mobile unit 105. Furthermore, the mobile unit 105 may include other elements not shown in FIG. 1.

The base station 110 includes a transmitter 150 and a receiver 155, which are both coupled to at least one antenna, such as the radio station tower 160. The transmitter 150 and the receiver 155 are coupled to an encoder 165 and a decoder 170, respectively. The encoder 165 and the decoder 170 are coupled to a base station controller 175. In the illustrated embodiment, the transmitter 150, the receiver 155, the encoder 165, the decoder 170, and the base station controller 175 are depicted as separate elements. However, persons of ordinary skill in the art should appreciate that a present invention is not so limited. In alternative embodiments, portions of the transmitter 150, the receiver 155, the encoder 165, the decoder 170, and/or the base station controller 175 may be combined into a single element or may be incorporated into other portions of the base station 110. Furthermore, the base station 110 may include other elements not shown in FIG. 1.

In operation, the mobile unit controller 145 may provide a message to the encoder 135, which may encode the message according to any desirable encoding algorithm, such as a Viterbi encoding algorithm. The encoded message includes one or more blocks or frames having a plurality of symbols. The symbols are then provided to the transmitter 125 which may transmit the symbols over the air interface 115 using the antenna 120. Messages may also be received using the antenna 120 and the receiver 130. The received messages may then be provided to the decoder 140, which may decode the received symbols. For example the received symbols may be decoded using a Viterbi decoding algorithm. Persons of ordinary skill in the art should appreciate that the present invention is not limited to Viterbi encoding and/or decoding and, in alternative embodiments, any desirable encoding/decoding technique and/or algorithm may be used.

The base station 110 may also transmit and/or receive messages. In the illustrated embodiment, messages to be transmitted may be provided by the base station controller 175, encoded by the encoder 165, and then transmitted over the air interface 115 by the transmitter 150 using the radio tower 160. Messages may also be received by the radio tower 160 and the receiver 155. Symbols in the received messages may then be decoded by the decoder 170 and provided to the base station controller 175. As discussed above, any desirable encoding and/or decoding technique or algorithm may be used by the base station 110.

Figure 2A:
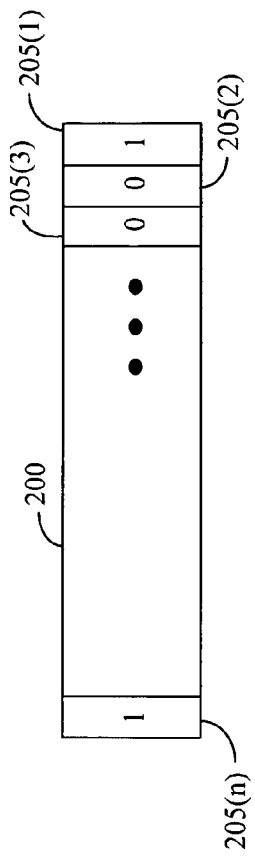
FIG. 2A conceptually illustrates a message that may be encoded for transmission over an air interface.

FIG. 2A conceptually illustrates a message 200 that may be encoded for transmission over the air interface 115 by either the mobile unit 105 or the base station 110. In the illustrated embodiment, the message 200 includes a plurality of bits 205(1-$n$). For example, the bit 205(1) is set to the value of 1, the bit 205(2) is set to the value of 0, the bit 205(3) is set to the value of 0, and the bit 205($n$) is set to the value of 1. The message 200 may contain any desirable number of bits 205 ($n$). For example, the message 200 may be a block containing 192 bits 205(1-$n$). The message 200 may then be provided to an encoder, such as the encoders 135, 165 shown in FIG. 1, for encoding prior to transmission over the air interface.

Figure 2B:
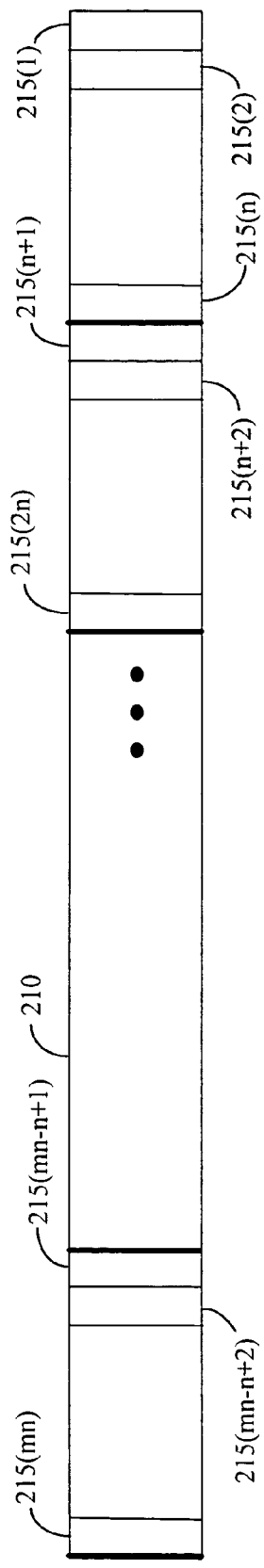
FIG. 2B conceptually illustrates a block that may be transmitted over an air interface.

FIG. 2B conceptually illustrates a block 210 that may be transmitted over an air interface, such as the air interface 115 shown in FIG. 1. In the illustrated embodiment, the block 210 includes a plurality of symbols 215 that are formed by encoding the bits 205(1-$n$) in the message 200 shown in FIG. 2A using a rate-1/m encoder algorithm. Accordingly, the block 210 includes m·n symbols 215(1-$m \cdot n$), where the dash indicates a range of values for the corresponding index. For example, the message 200 may be encoded using a rate-⅛ encoder algorithm so that the block 210 includes 8n symbols 215. Persons of ordinary skill in the art should appreciate that the present invention is not limited to encoder algorithms of any particular rate. For example, the message 200 may be encoded using a rate-⅔ encoder algorithm. The symbols 215 in the block 210 may then be transmitted over the air interface to another device, where they may be decoded.

Figure 2C:
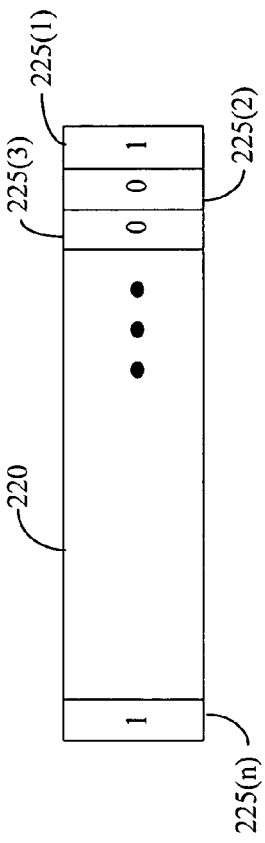
FIG. 2C conceptually illustrates a decoded message.

FIG. 2C conceptually illustrates a decoded message 220, such as may be produced by the decoders 140, 170 shown in FIG. 1. In the illustrated embodiment, the message 220 includes bits 225(1-$n$) the values that correspond to the bits 205(1-$n$) in the message 200. The decoding operation may be considered a successful decode because the values of the bits 225(1-$n$) in the decoded message 220 correspond to the values of the bits 205(1-$n$) in the message 200. However, persons of ordinary skill in the art should appreciate that a one-to-one correspondence between the bits 225(1-$n$) and the bits 205(1-$n$) may not be the only criterion indicating a successful decode of the block 210. For example, in some embodiments, a certain number of the bits 225(1-$n$) may not correspond to the bits 205(1-$n$), possibly due to some error in encoding, transmission, and/or decoding. However, a small number of errors may not be considered significant and so the decoding may still be considered successful if a small number of errors are present in the decoded message 220. The precise number of errors that may be considered insignificant is a matter of design choice and not material to the present invention.

Referring now to FIGS. 1 and 2A-C, the mobile unit controller 145 and/or the base station controller 175 can determine a transmission power for messages that are transmitted by the transmitters 125, 150. The mobile unit controller 145 may provide an indication of the transmission power level to the transmitter 125, which may transmit messages at approximately the selected transmission power level. In various alternative embodiments, the transmission power may be selected to balance competing constraints that may include, but are not limited to, desire for a low bit error rate for blocks transmitted across the air interface 115, low system interference between transmissions over the air interface 115 and other transmissions in the wireless telecommunications system 100, and long battery life for battery-powered devices in the wireless telecommunications system 100, such as the mobile unit 105.

The mobile unit controller 145 and/or the base station controller 175 may modify the selected transmission power level during transmission of the block 210 over the air interface 115 in response to successfully decoding a portion of the block 210. In one embodiment, if the decoder 170 successfully decodes the block 210 based upon a portion of the block 210, the base station 110 transmits one or more bits to the mobile unit 105 instructing the transmitter 125 to power-down for half of the remaining sub-intervals of the block 210 and then to power-up during the final half of any remaining sub-intervals of the block 210, thereby returning the transmission power level to a desired value in preparation for transmission of the next block. The intervening power levels may be driven to low values as quickly as is possible without changing the currently employed power-control signaling so that it may not be necessary to modify the existing power control protocol standards. For example, the decoder 170 attempts to decode a first portion 215(1-8) when the base station 110 receives the first portion 215(1-8) of the block 210. If the decoder 170 successfully decodes the first portion 215(1-8), the base station controller 175 may provide an indication of a reduced transmission power level to the mobile unit 105, which may then transmit subsequent portions 215 (9-$mn$) of the block 210 at a reduced transmission power level, as will be discussed in detail below.

Figure 3:
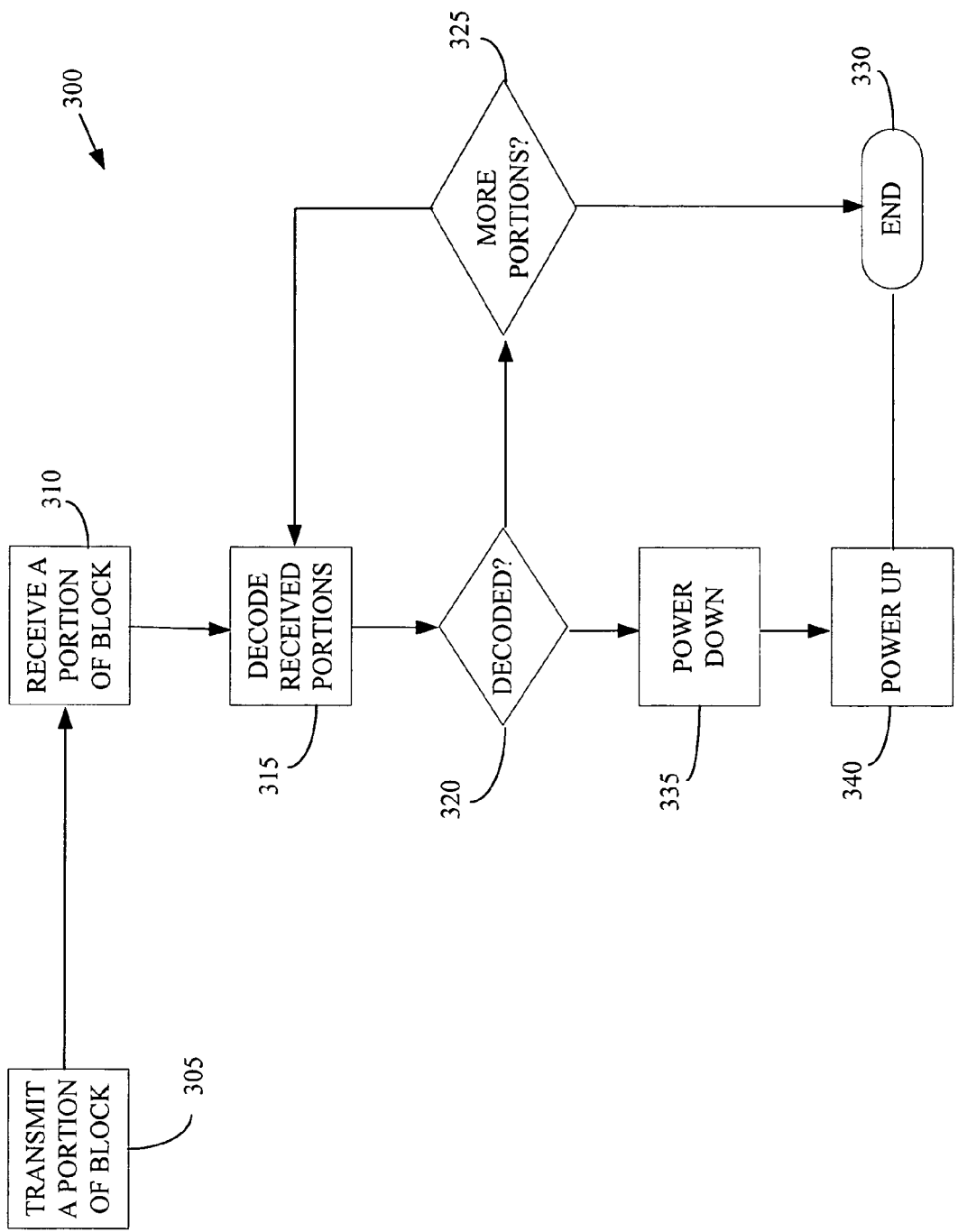
FIG. 3 conceptually illustrates a method of controlling a transmission power level based upon early decoding of one or more received portions of a block.

FIG. 3 conceptually illustrates a method 300 of controlling a transmission power level based upon early decoding of one or more received portions of a block, such as the block 210 shown in FIG. 2B. In the following discussion, the method 300 will be described with reference to a transmitter, a receiver, an encoder, a decoder, a transmission controller, and a reception controller. Persons of ordinary skill in the art should appreciate that the method 300 may be implemented in any desirable device capable of transmitting and/or receiving messages over an air interface. Accordingly, in various alternative embodiments, the transmitter, the receiver, the encoder, the decoder, the transmission controller, and the reception controller may be implemented in a variety of possible devices. For example, the method 300 and the aforementioned elements may be implemented in one or more mobile units 105 and/or base stations 110, as discussed above, as well as in personal computers, laptop computers, personal data assistants, access points, relays, and the like.

The transmitter transmits (at 305) a portion of a block at a first transmission power level, which may be selected by the transmission controller. The block includes symbols indicative of bits of a message that has been encoded by the encoder. The receiver receives (at 310) the transmitted portion of the block. For example, the portion of the block may be transmitted by a mobile unit and received by a base station, as described above. The decoder attempts (at 315) to decode the received portion of the block and determines (at 320) whether or not the received portion of the block was successfully decoded. In one embodiment, the portions of the block that have not yet been received are treated as erasures. Persons of ordinary skill in the art should appreciate that any desirable method of determining (at 320) whether or not the received portion of the block was successfully decoded (at 315) may be used.

If the received portion of the block was not successfully decoded (at 315), the reception controller may determine (at 325) whether or not more portions of the block have been received or may be received. One or more additional attempts to decode the received portions may be made (at 315) if the reception controller determines (at 325) that more portions have been received or may be received. For example, newly received portions of the block may be combined with previously received portions of the block and the decoder may attempt (at 315) to decode the combined portions of the block. If no additional portions of the block have been received (at 325) or are expected to be received (at 325), the method 300 ends (at 330).

If the decoder determines (at 320) that the block has been successfully decoded based upon the one or more received portions of the block, the transmitter may power down (at 335). For example, the block may be successfully decoded using only approximately one-quarter of the symbols, so that the transmitter may power down (at 335) while transmitting the remaining symbols. In one embodiment, powering down (at 335) includes the reception controller providing a message indicating that desirable to power down (at 335). The transmission controller receives the message and then reduces the transmission power level by a selected account. For one example, the message may be one or more bits, each bit indicating that the transmission power level should be reduced by a predetermined increment. The power-down bits may be provided in one or more slots in a single block or in a plurality of blocks. For another example, the message may be a power-off message indicating that the transmitter should reduce the transmission power to a very small level or stop transmitting altogether.

In one embodiment, it may be desirable to increase the transmission power level prior to transmitting symbols associated with subsequent blocks. Thus, the transmitter may power up (at 340) substantially after powering down (at 335). In one embodiment, the reception controller may provide a message indicating that it is desirable to increase the transmission power level and the transmitter may increase the transmission power level used to transmit symbols in response to receiving the message. For example, the reception controller may provide one or more bits, each bit indicating that the transmission power level should be increased by a predetermined increment. For another example, the reception controller may provide a power-on message indicating that the transmitter should increase the transmission power level to the initial transmission power level or that the transmitter should resume transmitting. In one embodiment, the transmission power level after powering up (at 340) may be substantially equal to the transmission power level prior to powering down (at 335). However, persons of ordinary skill in the art should appreciate that the present invention is not so limited. For example, the transmission power level after powering up (at 340) may be less than the transmission power level prior to powering down (at 335). The method 300 may end (at 330) after powering up (at 340).

Figure 4A:
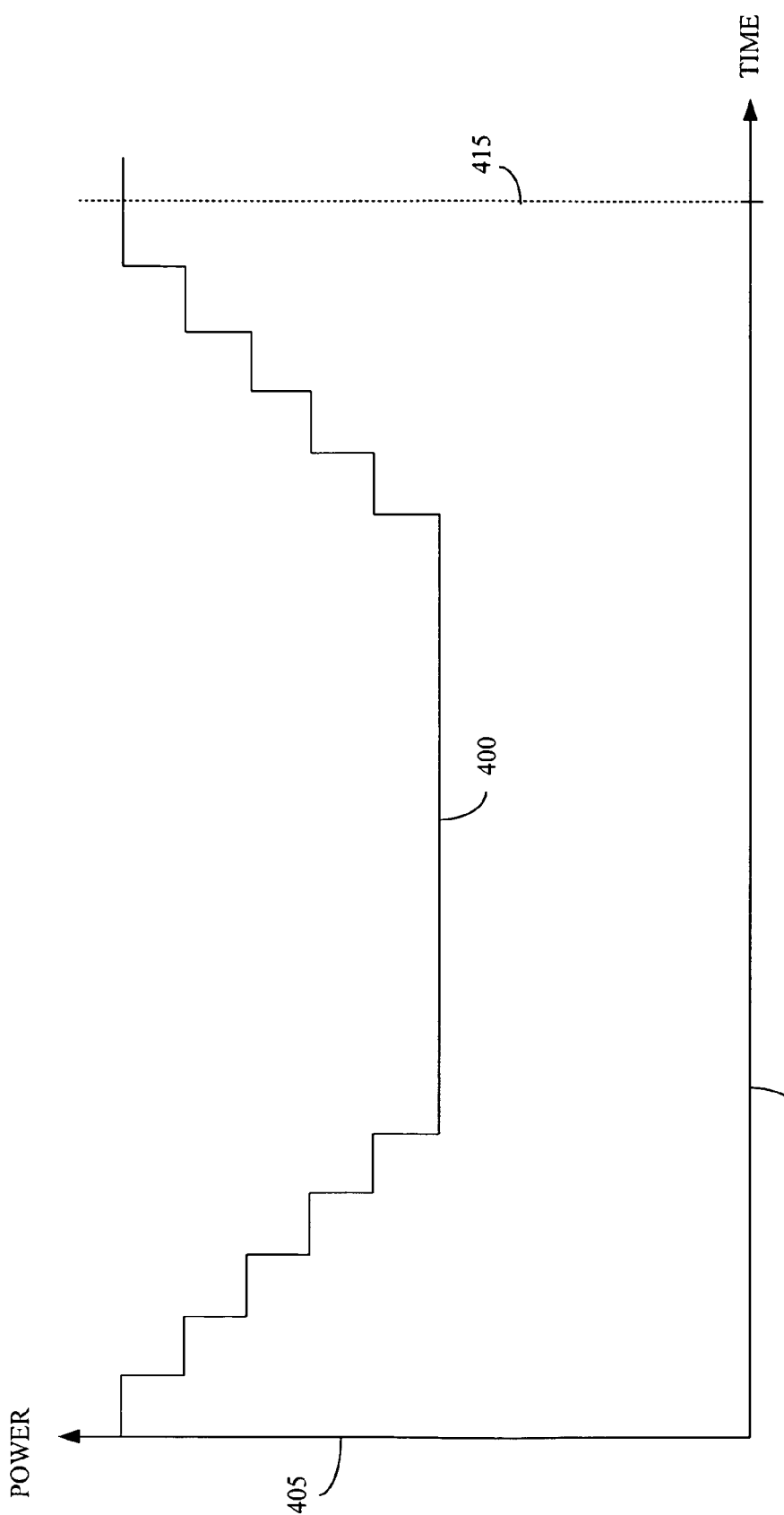
FIG. 4A conceptually illustrates a transmission power level during a first embodiment of a power-down sequence and a power-up sequence associated with transmission of a block.

FIG. 4A conceptually illustrates a transmission power level 400 during a first embodiment of a power-down sequence and a power-up sequence associated with transmission of a block. The vertical axis 405 is indicative of the transmission power level and the horizontal axis 410 is indicative of the elapsed time during transmission of the block. However, persons of ordinary skill in the art should appreciate that the horizontal axis 410 may also be indicative of slots in the transmission frame. In the first embodiment illustrated in FIG. 4A, a reception controller provides a series of bits, each bit indicating that the transmission power level 400 should be reduced by a predetermined increment. The transmitter reduces the transmission power level 400 by the predetermined increment in response to receiving each bit. Accordingly, the transmission power level 400 is reduced in a stairstep fashion. As the end of the block approaches, as indicated by vertical dashed line 415, the reception controller provides a series of bits, each bit indicating that the transmission power level 400 should be increased by a predetermined increment. The transmitter increases the transmission power level 400 by the predetermined increment in response to receiving each bit. Accordingly, the transmission power level 400 increases in a stairstep fashion until it reaches a level approximately equal to the initial value of the transmission power level 400.

Figure 4B:
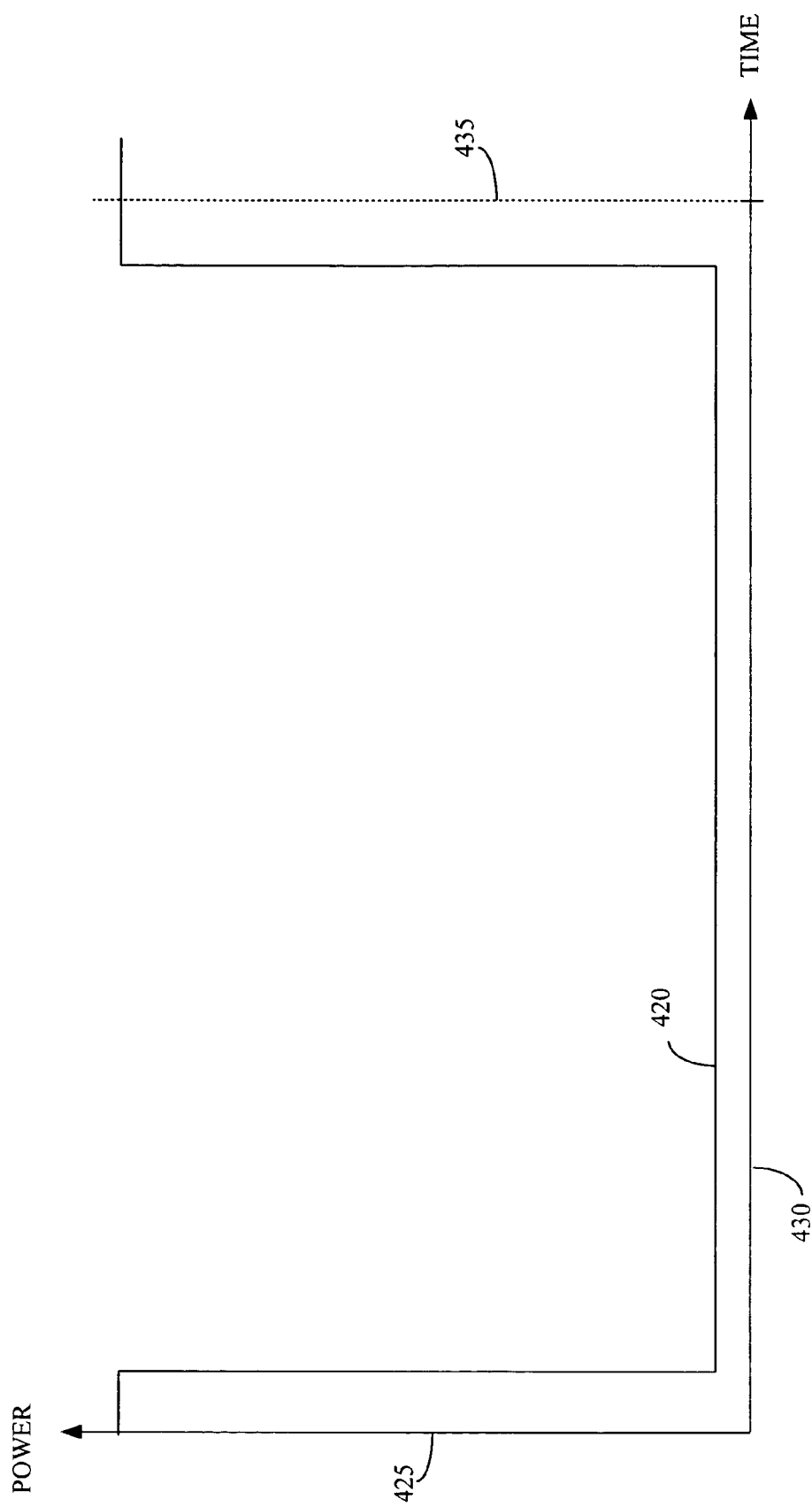
FIG. 4B conceptually illustrates a transmission power level during a second embodiment of a power-down sequence and a power-up sequence associated with transmission of a block.

FIG. 4B conceptually illustrates a transmission power level 420 during a second embodiment of a power-down sequence and a power-up sequence associated with transmission of a block. The vertical axis 425 is indicative of the transmission power level and the horizontal axis 430 is indicative of the elapsed time during transmission of the block. However, persons of ordinary skill in the art should appreciate that the horizontal axis 430 may also be indicative of slots in the transmission frame. In the second embodiment illustrated in FIG. 4B, a reception controller provides a power-off message and the transmitter decreases the transmission power level 420 in response to receiving the power-off message. Accordingly, the transmission power level 420 is reduced to a very low value. In one embodiment, transmission is stopped, i.e. the transmission power level 420 is reduced to approximately zero. As the end of the block approaches, as indicated by vertical dashed line 435, the reception controller provides a power-on message and the transmitter increases the transmission power level 420 in response to receiving the power-on message. Accordingly, the transmission power level 420 is increased to approximately the initial level of the transmission power level 420.

By implementing one or more of the aforementioned embodiments, the efficiency of coded transmission may be improved while maintaining the desired performance of the wireless telecommunication system 100 shown in FIG. 1. For example, system interference may be reduced and battery life may be increased while maintaining a desired bit error rate.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
  accessing a first portion of a block including a plurality of symbols indicative of an encoded message, the first portion having been transmitted at a first transmission power and having less than all of the plurality of symbols;
  attempting to decode the encoded message using the first portion of the block;
  determining whether the encoded message was decoded;

providing an indication of a second transmission power in response to determining that the encoded message was decoded; and accessing at least one second portion of the block, each second portion of the block comprising less than all of the plurality of symbols.

2. The method of claim 1, further comprising attempting to decode the encoded message using the first portion of the block and the at least one second portion of the block.

3. The method of claim 2, further comprising determining whether the encoded message was decoded using the first portion of the block and the at least one second portion of the block.

4. The method of claim 3, further comprising providing an indication of a second transmission power in response to determining that the encoded message was decoded using the first portion of the block and the at least one second portion of the block.

5. A method, comprising:
accessing a first portion of a block including a plurality of symbols indicative of an encoded message, the first portion having been transmitted at a first transmission power and having less than all of the plurality of symbols;
attempting to decode the encoded message using the first portion of the block;
determining whether the encoded message was decoded;
providing an indication of a second transmission power in response to determining that the encoded message was decoded; and
providing an indication of a third transmission power substantially after providing the indication of the second transmission power.

6. The method of claim 5, wherein providing the indication of a third transmission power comprises providing at least one bit indicative of a desired increase in the third transmission power relative to the second transmission power.

7. The method of claim 5, wherein providing the indication of the third transmission power comprises providing a power-on message.

8. A method, comprising:
providing a first portion of a block including a plurality of symbols indicative of an encoded message, the first portion being provided at a first transmission power and having less than all of the plurality of symbols;
receiving an indication of a second transmission power in response to providing the first portion of the block;
providing a second portion of the block at the second transmission power; and
receiving an indication of a third transmission power substantially after receiving the indication of the second transmission power.

9. The method of claim 8, wherein receiving the indication of the third transmission power comprises receiving at least one bit indicative of a desired increase in the third transmission power relative to the second transmission power.

10. The method of claim 8, further comprising providing at least one portion of the block at the third transmission power in response to receiving the indication of the third transmission power.

11. The method of claim 8, wherein receiving the indication of the third transmission power comprises receiving a power-on message.

12. The method of claim 11, further comprising providing additional portions of the block in response to receiving the power-on message.

* * * * *